March 22, 1966     K. B. KILBOURNE     3,241,811
DEEP WATER SAMPLING VALVE
Original Filed March 1, 1963     2 Sheets-Sheet 1
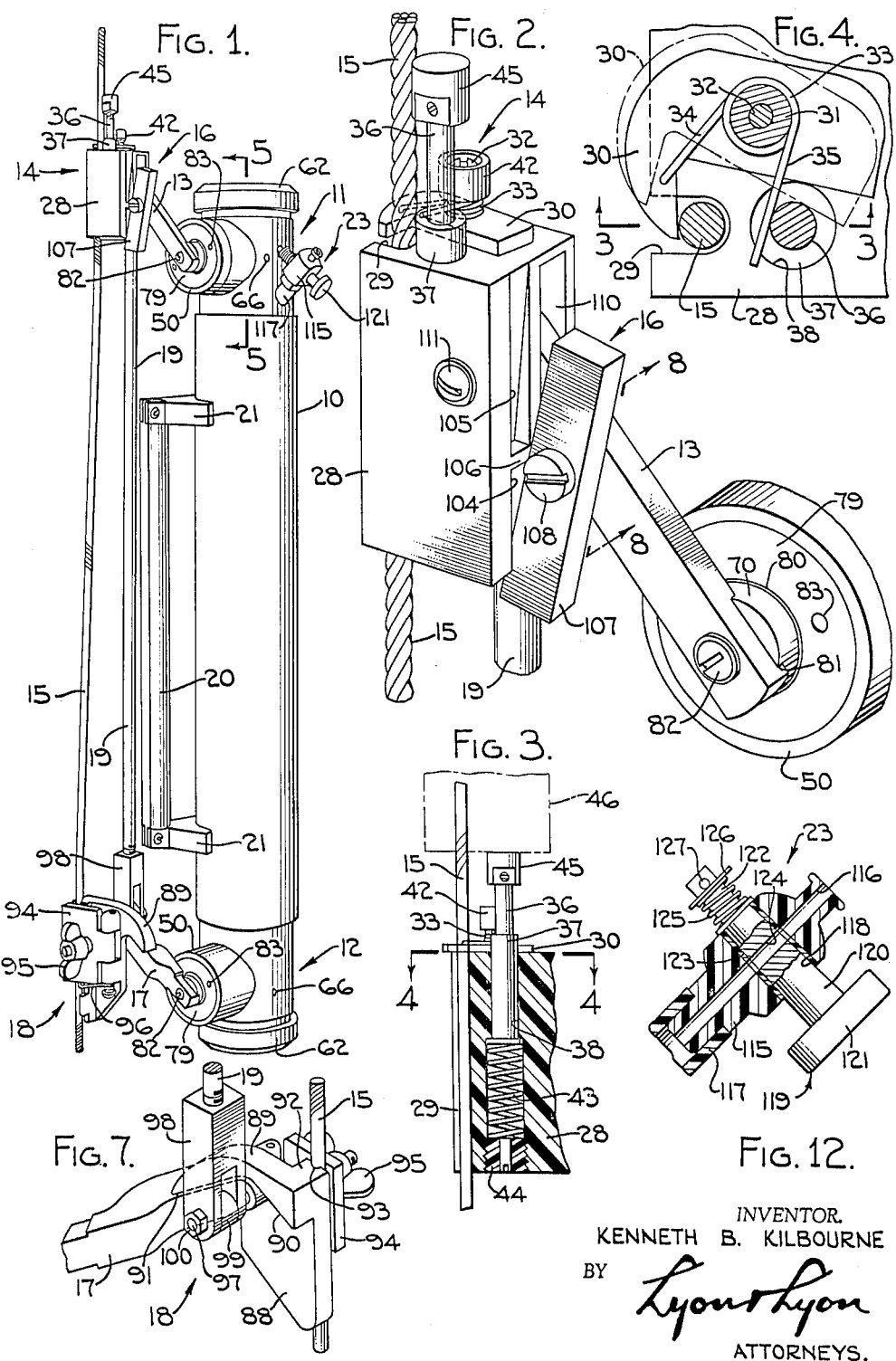
INVENTOR.
KENNETH B. KILBOURNE
BY
ATTORNEYS.

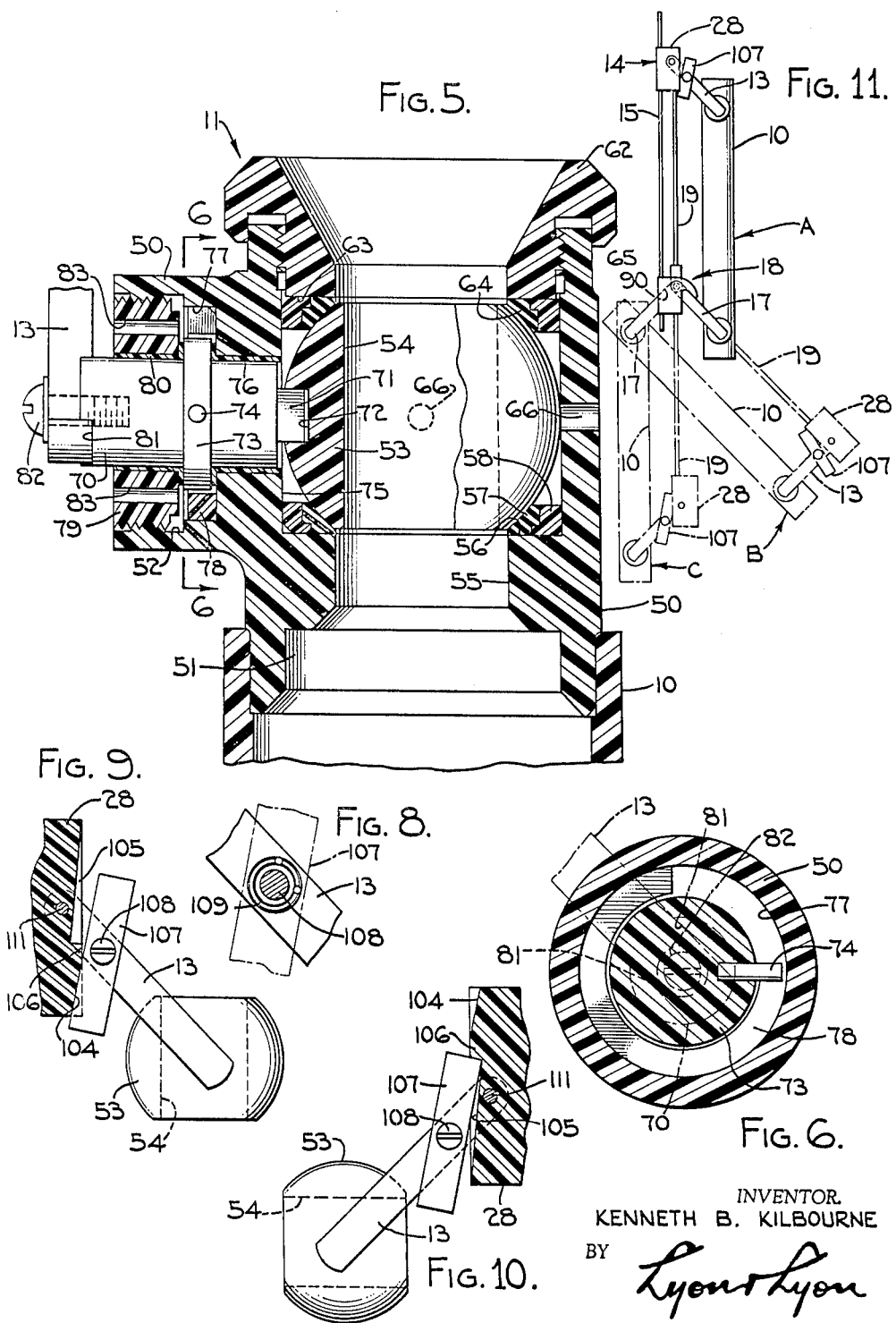

United States Patent Office 3,241,811
Patented Mar. 22, 1966

3,241,811
DEEP WATER SAMPLING VALVE
Kenneth B. Kilbourne, Van Nuys, Calif., assignor to Standard Polymer, Inc., Van Nuys, Calif., a corporation of California
Original application Mar. 1, 1963, Ser. No. 262,265. Divided and this application Mar. 3, 1965, Ser. No. 444,489
1 Claim. (Cl. 251—288)

This is a division of application Serial No. 262,265 filed March 1, 1963.

This invention relates to a sampling apparatus and more particularly relates to a sampling apparatus for taking an uncontaminated sample at any depth in a body of fluid.

In order to make chemical and biological analyses of the characteristics and composition of the water found at various depths in a body of water, it is necessary to provide apparatus for taking a sample at a desired depth without there being any possibility of contamination of the sample by the water passed through on the way to or from the desired depth. For deep water use, the apparatus must be capable of being subjected to extremely high pressures, and if used in salt water, be able to withstand corrosion. Moreover, it is necessary that the sample-containing chamber be constructed of some inert material so that there is no contamination of the sample caused by its reaction with the chamber material. The sample apparatus must also be remotely operable, that is, there must be some way of trapping the sample in response to an act done on the surface.

It is therefore an object of the present invention to provide a sampling apparatus for taking uncontaminated samples from any depth in a body of fluid.

It is also an object of the present invention to provide such an apparatus wherein a pair of valves may be simultaneously operated to trap a sample.

It is another object of the present invention to provide such an apparatus wherein one end of the apparatus is firmly attached to the lowering cable and the other end of the apparatus is releasably engaged with the lowering cable, and wherein the inversion of the apparatus when the cable is released causes a sample to be trapped.

It is still another object of the present invention to provide a valve for use in such an apparatus in a high pressure environment.

According to the present invention, a sampling apparatus is provided having a sample receiving chamber and a pair of passageways in communication with the chamber. A valve is positioned in each passageway and may be closed to prevent transfer of fluid between the chamber and the body of fluid in which it is emerged. The sampling apparatus may be attached to a cable by a clamp and by a releasably engaging mechanism which mechanism can be caused to release the cable by sliding a weight down the cable. Upon such release, the apparatus is caused to pivot about the clamp with the result that a pair of interconnected valve actuators cause the valves to close and trap a sample. The apparatus is constructed on non-corrosive materials and is provided with various pressure ports to prevent implosion or other structural damage.

The details of the invention, as well as further objects and advantages thereof, will become more apparent upon reference to the accompanying description and drawings in which:

FIGURE 1 is a perspective view of the sampling apparatus of the present invention;

FIGURE 2 is a perspective view of a cable release and valve lock assembly;

FIGURE 3 is a view, partly in section, of the cable release mechanism taken along lines 3—3 of FIGURE 4;

FIGURE 4 is a view, partly in section, of the cable release mechanism taken along lines 4—4 of FIGURE 3;

FIGURE 5 is an enlarged sectional view of a plug valve assembly taken along lines 5—5 of FIGURE 1;

FIGURE 6 is a sectional view taken along lines 6—6 of FIGURE 5;

FIGURE 7 is a perspective view of a cable clamp assembly;

FIGURE 8 is a detail view taken along lines 8—8 of FIGURE 2;

FIGURES 9 and 10 are operative views of the valve lock assembly showing it in the unlocked and locked positions respectively; and FIGURE 11 is a diagrammatic showing of the operation of the sampling apparatus of the present invention.

FIGURE 12 is a sectional view of a drain valve assembly according to the present invention.

Referring now to FIGURE 1, there is shown a sampling apparatus constructed according to the present invention. The sampling apparatus has a hollow, sample holding cylindrical housing 10 which can be opened or closed to the surrounding medium by means of plug valve assemblies 11 and 12. The actuating lever 13 of the plug valve assembly 11 has its outer end pivotally mounted in a cable clamp and release mechanism 14 which is shown grasping a cable 15. A valve lock 16 is provided to cooperate with the valve actuating lever 13 and cable clamp and release mechanism 14 to lock the plug valve in a predetermined position.

The valve actuating lever 17 of the plug valve assembly 12 has its outer end pivotally mounted on a cable clamp assembly 18 which also grasps the cable 15. The cable clamp and release mechanism 14 and the cable clamp assembly 18 are joined by a connecting rod 19. For purposes of convenient handling, the sampling apparatus is provided with a handle 20 mounted on the housing 10 by means of supports 21. A drain valve 23 is provided for draining the interior of the housing 10 if it is desired to do so without opening the plug valves, for example, to withdraw a small sample.

Referring now to FIGURES 2, 3 and 4, the cable clamp and release mechanism 14 is shown in more detail. The cable clamp and release mechanism 14 and valve lock 16 share a block 28, one side of which is provided with a channel 29 through which passes the cable 15. If desired, the cable clamp and release mechanism 14 could be mounted on a separate block mounted on the housing. Mounted on top of the block 28 is an L-shaped lever 30. The L-shaped lever 30 is pivotally mounted on a sleeve 31 which is held in place by a screw 32 threadedly engaged with the block 28. A coil spring 33 is wrapped around the sleeve 31 and has one end 34 engaged with the L-shaped lever 30 and the other end 35 engaged with a reduced portion 36 of a releasing rod 37 which is positioned in a bore 38 in the block 28.

The spring 33 is held in place by a head 42 positioned over the sleeve 31 and serves to force the L-shaped lever 30 away from the channel 29. When the mechanism 14 is set in a cable clamp position, the releasing rod 37 is in an elevated position as shown in FIGURE 3, the rod 37 thereby engaging the L-shaped lever and holding it over the channel 29 and cable 15 against the bias of the spring 33. This position is shown in solid lines in FIGURE 4. The rod 37 is maintained in this upward position by means of a spring 43 which seats on a plastic sleeve 44 which is screw-threaded into the bore 38. The sleeve 44 permits communication between the bore 38 and the surrounding pressures on the block 28. The rod 37 is provided with a head 45 adapated to be engaged by a weight 46 dropped down the cable 15.

When the weight 46 engages the head 45, the rod 37 is pushed downward against the force of the spring 43 with the result that the shoulder of the reduced portion 36 of the rod 37 becomes flush with the upper surface of the block 28. The spring 33 is now able to force the L-shaped lever 30 to rotate in a clockwise direction until it engages the reduced portion 36 of the rod 37. Rotation of the lever 30 to this position (shown in phantom in FIGURE 4) permits the cable 15 to leave the channel 29 as the upper end of the sampling apparatus falls away from the cable 15 as a result of its center of gravity being laterally displaced from the pivot point of the lever 17 on the clamp assembly 18.

Turning now to FIGURES 5 and 6, there is shown in detail the construction of the plug valve assemblies 11 and 12. Both of these assemblies are identical and therefore, for purposes of simplicity, only the plug valve assembly 11 is shown in detail. The plug valve assembly 11 has a valve body 50 having an axial passageway 51 extending therethrough and a radial passageway 52 in communication with the axial passageway 51. Positioned within the passageway 51 is a ball valve element or member 53 having a passageway 54 therethrough.

The axial passageway 51 has a reduced portion 55 which forms a shoulder 56. Seated on the shoulder 56 is an annular seal 57, preferably of polytetrafluoroethylene, which is held in position by packing 58. The seal 57 prevents leakage around the ball 53 but permits it to rotate easily. Threadedly connected to the valve body 50 is a hollow cap 62, the bottom surface of which forms a shoulder 63 on which is seated a second annular seal 64 and a packing 65. The seal 64 is of the same material, and acts in the same manner as the seal 57. It can thus be seen that when the ball 53 is in the position shown in FIGURE 5, the passageway 54 in the ball is aligned with the passageway 51 in the valve body and fluid can flow freely between the surrounding medium and the chamber in the housing 10. When the ball 53 is rotated approximately 90 degrees from the position shown, the passageway 54 of the ball 53 is no longer in alignment with the passageway 51 and passage of fluid between the interior of the housing 10 and the surrounding medium is prevented by ball 53 and the seals 57 and 64.

In order to keep the pressure in the interior of the valve body equal to that of the surrounding medium, a pair of passageways 66 are provided through the valve body 50. These passageways, of course, have no effect on the passage of fluid through the valve but do permit fluid to enter to lubricate the valve.

The ball valve element 53 is actuated by a stem 70 which is positioned in the radial passageway 52. The inner end of the stem 70 is provided with a key 71 which enters a suitably shaped aperture 72 in the wall of the ball 53. The key 71 and aperture 72 are, of course, non-circular so that rotary movement of the stem 70 will cause corresponding movement of the ball 53. The stem 70 is provided with an annular ring 73 from which protrudes a pin 74. This ring prevents lateral movement of the stem 70 and thus prevents the key 71 from moving out of the aperture 72 or exerting too great force on the ball 53.

For purposes of supporting the stem 70, the passageway 52 is provided with a reduced portion 75 which supports a bushing 76 in which the stem rotates. The passageway is also provided with a shoulder 77 on which is mounted a split bumper 78 annularly extending about 270° and cooperating with the pin 74 to limit rotation of the stem 70 to approximately 90°. The stem 70 is held in place by a retainer 79 which is screw-threaded in the passageway 52. A bushing 80 is mounted in the retainer 79 to provide a good bearing surface for the stem 70. The bushing 80, like the bushing 76, is provided with a radial flange that engages the ring 73 and provides a bearing surface for this ring.

The stem 70 is provided with a rectangular slot 81 for receiving one end of the valve actuating lever 13. The lever 13 is held in place by a screw 82. The retainer 79 is provided with a plurality of passageways 83 which act as pressure equalizing ports and permits the equalizing of the pressure within the passageway 52 with that of the surrounding medium.

Referring now to FIGURE 7, the cable clamp assembly 18 is shown in more detail. A plate 88 is provided on its rear side with a shoulder 89 having a leading surface 90 and a trailing surface 91. The front side of the plate 88 is provided with a raised block 92 having a channel 93 therein for receiving the cable 15. As can best be seen in FIGURE 1, a hinged cover plate is held in place and forced to firmly engage the cable 15 by a wing nut 95. The cover plate 94 is preferably biased away from the cable 15 by means of a spring 96.

As shown in FIGURE 7, the outer end of the valve actuating lever 17 is pivotally mounted on a shaft 97 extending outwardly from the rear side of the plate 88. Also mounted on the shaft 97 is a clevis 98 which is attached to the lower end of the connecting rod 19. A spacer 99 is positioned between the two arms of the clevis 98 to keep them properly spaced apart and a nut 100 is threaded on the end of the shaft 97 to maintain the clevis 98 and valve actuating lever 17 on the shaft 97.

Refering now to FIGURES 8, 9 and 10, as well as FIGURE 2, the operation of the valve lock 16 is shown. The block 28 is provided with first and second oblique slots 104 and 105, both of the slots being angled in the same direction and separated by a narrow spacer 106. The slots 104 and 105 cooperate with a dog 107 which is pivotally mounted on the valve actuating lever 13 by means of a bolt 108. A coil spring 109 has one end attached to the valve actuating lever 13 and the other end attached to the dog 107 and acts to urge the dog to rotate clockwise into engagement with the block 28.

The block 28 is provided with a slot 110 that parallels the slots 104 and 105 and receives the end of the valve actuating lever 13 for pivotal movement about a bolt 111. As can be seen from FIGURES 9 and 10, when the lever 13 pivots about the bolt 111 in a counterclockwise direction relative to the block 28, the dog 107 slides up the slot 104, across the spacer 106, and into the slot 105. Once the dog 107 has entered the slot 105, clockwise rotation of the lever 13 relative to the block 28 is prevented, as the spring 109 forces the dog 107 against the wall of the spacer 106.

Referring now to FIGURE 12, there is shown in more detail the structure of the drain valve assembly 23. A housing 115 has a longitudinal passageway 116 formed therein which communicates with a drain pipe 117 protruding from the plug valve assembly 11 and communicating with the interior of the plug valve assembly 11. The housing 115 can be attached to the drain pipe 117 in any suitable manner, for example, by a press fit. The housing 115 has a tapered, lateral passageway 118 formed therein which intersects the longitudinal passageway 116.

A plug 119 has a tapered body 120, a knob 121 and a reduced portion 122. The body 120 is provided with a sealing sleeve 123 over a portion of its length. A passageway 124 is formed through the sleeve 123 and the body 120 in a location permitting this passageway to be aligned with the passageway 116 when the plug 119 is in a first position whereby fluid may flow through these passageways.

To prevent flow of fluid through these passageways, the plug 119 is merely rotated until the passageway 124 is out of alignment with the passageway 116. The sealing sleeve 123 prevents any leakage around the plug, either to the passageway 116 or to the exterior of the housing. The plug is held in position by means of a coil spring 125 which is positioned about the reduced portion 122 and acts against a washer 126 and pin 127 to force the plug as far as possible into the tapered passageway 118. For the purpose of establishing a good seal, the sleeve 118 should be constructed of a material softer than that used in the construction of the housing 115 and the plug 119. All of these parts are preferably of plastic, the housing 115 and the plug 119 preferably being constructed of a polycarbonate resin such as that sold by the trade name of Lexan while the sleeve 123 is preferably made of polytertafluoroethylene. The sleeve 123 may be firmly mounted on the tapered body 120 by conventional differential techniques.

The operation of the above described sampling apparatus will now be explained. The sampling apparatus is attached to the cable 15 by means of the cable clamp and release mechanism 14 and the cable clamp assembly 18. The cable clamp release mechanism is set so that the releasing rod 37 engages the L-shaped lever 30 and causes it to hold the cable 15 in the channel 29. The wing nut 95 is tightened to cause the cover plate 94 to firmly engage the lower end of the cable 15. In this position, shown in FIGURE 1 and in solid lines in FIGURE 11, the actuating levers 13 and 17 are positioned so as to cause the valve elements 53 to assume the position shown in FIGURE 5 so that fluid can enter the housing 10. In this position, the dog 107 is in the slot 104, the pins 74 of the stem 70 engage the ends of the split bumpers 78 to prevent further relative movement between the actuating levers and the plug valve assemblies, and the upper surface of the valve actuating lever 17 engages the trailing surface 91 of the shoulder 89 on the plate 88.

The sampling assembly is now lowered by means of the cable 15 to the desired depth in the body of water to be sampled. Since both the plug valves are open, the water passes freely through the housing 10 so that when the sampling assembly reaches the desired depth, only water at that depth is contained in the chamber in the housing 10. The weight 46 is now slid down the cable 15 to engage the head 45 of the releasing rod 37.

The weight 46 causes the releasing rod 37 to be pressed downwardly against the force of the spring 43 until the L-shaped lever 30 is free to move under the force of the spring 33 until it engages the reduced portion 36 of the rod 37. This movement of the lever 30 enables the cable to leave the channel 29 in the block 28 and the sampling assembly to fall away from the cable 15. The cable 15, of course, is still firmly grasped by the cable clamp assembly 18 so the entire apparatus rotates about the shaft 97 on the cable clamp assembly. After the apparatus has rotated about 105 degrees, the bottom surface of the valve actuating lever 17 engages the leading surface 90 of the shoulder 89 on the plate 88. The position of the apparatus shortly after this engagement is shown in phantom at B in FIGURE 11.

Since the cable clamp assembly 18 is held stationary, the valve actuating lever 17 can no longer move and continued movement of the sampling apparatus causes the movement of the plug valve assembly 12 relative to this lever. This relative movement causes the valve body 50 to move relative to the valve element 53 which is held against movement by the key 71 on the stem 70. This movement continues until the passageway 54 in the ball 53 is out of alignment with the passageway 51 of the valve body 50, thereby preventing escape of fluid from the interior of the cylinder 10.

Since the block 28 is maintained a constant distance from the cable clamp assembly 18 by the actuating rod 19, the lever 13 is maintained substantially parallel to the lever 17. Movement of the housing 10 causes relative movement between the valve actuating lever 13 and its valve body 50, thereby causing the passageway 54 in the ball valve element 53 to rotate out of alignment with the axial passageway 51 in the valve body 50, and closing the other end of the housing 10. When the sampling apparatus has moved to the position shown in phantom at C in FIGURE 11, the valves are closed.

The relative movement of the valve actuating lever 13 and the block 28 has also caused the dog 107 to move into the slot 105. These members are thus locked against further relative movement and prevent further movement of the sampling apparatus relative to the cable clamp assembly 18. The cable 15 is now hauled up, the plug valve assemblies 11 and 12 preventing any flow of fluid into or out of the housing 10. An uncontaminated sample of the water at a given depth is thus obtained, desired portions of which may be removed through the drain valve 23. Throughout the lowering and raising operation, the various pressure ports previously described have equalized the pressure on all parts of the structure and thereby prevented any implosion or other damage to the structure.

From the foregoing description it can be seen that a sampling apparatus has been provided that is able to obtain an uncontaminated sample at virtually any depth in a body of the fluid. All of the elements except the various nuts and bolts, the levers 13 and 17, the assemblies 14 and 18 and the pins 74 which are made of stainless steel are constructed of any suitable plastic. Thus the sample is uncontaminated by metal. The plastic construction provides visibility of the sample, light weight, durability and high impact resistance. The two pressure equalized plug valves prevent any leakage and provide high mechanical reliability. The apparatus requires little maintenance, which may be performed with the simple tools commonly available.

The invention may be embodied in other specific forms not departing from the spirit or central characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

I claim:

A valve for use in deep water sampling apparatus, comprising:

a valve body having an axial passageway therethrough and a radial passageway in communication with said axial passageway, said axial passageway having a reduced portion forming an annular shoulder on one side of said radial passageway;

a first annular sealing member positioned on said shoulder around said reduced portion of said passageway;

a first annular packing positioned on said shoulder and in engagement with said first sealing member to maintain said sealing member in position;

a ball valve element positioned in said axial passageway in sealing engagement with said first sealing member, said ball valve element having a passageway therethrough;

a cap for engaging said valve body on the other side of said radial passageway, said cap having a passageway therethrough in alignment with said axial passageway and an annular shoulder around said passageway;

a second annular sealing member positioned on said shoulder of said cap around said passageway and in sealing engagement with said ball valve element;

a second annular packing positioned on said shoulder of said cap and in engagement with said second sealing member to maintain said sealing member in position;

a valve stem extending through said radial passageway into keyed relation with said ball valve element whereby said ball valve element can be rotated from a position in which the passageway therein is in alignment wtih said axial passageway to a position in which the passageway therein is out of alignment with said axial passageway thereby preventing fluid flow therethrough;

a pin radially extending from said stem;

a split bumper positioned in said radial passageway and cooperating with said pin to limit the rotation of said stem;

a retainer positioned in said radial passageway and engaging said valve body for maintaining said stem in position, said retainer having at least one longitudinal passageway therein for equalizing the pressure on both sides of said retainer;

said valve body having at least one radial pressure port in communication with said axial passageway in the vicinity of said ball valve element for equalizing the pressure on both sides of the valve body.

References Cited by the Examiner
UNITED STATES PATENTS

| | | | |
|---|---|---|---|
| 1,784,381 | 12/1930 | O'Stroske | 137—315 |
| 1,973,418 | 9/1934 | Sibley | 137—315 |
| 3,068,887 | 12/1962 | Grove | 251—315 X |

ISADOR WEIL, *Primary Examiner.*

MARTIN P. SCHWADRON, *Examiner.*